United States Patent
Sughure, II et al.

(10) Patent No.: US 7,452,846 B2
(45) Date of Patent: Nov. 18, 2008

(54) DESULFURIZATION WITH OCTANE ENHANCEMENT

(75) Inventors: Edward L. Sughure, II, Bartlesville, OK (US); Bobby G. Cockrell, Bartlesville, OK (US); Glenn W. Dodwell, Bartlesville, OK (US); Brent J. Bertus, Bartlesville, OK (US)

(73) Assignee: China Petroleum & Chemical Corporation, Beijing (CN)

( * ) Notice: Subject to any disclaimer, the term of this patent is extended or adjusted under 35 U.S.C. 154(b) by 0 days.

(21) Appl. No.: 11/751,996

(22) Filed: May 22, 2007
(Under 37 CFR 1.47)

(65) Prior Publication Data
US 2007/0225156 A1      Sep. 27, 2007

Related U.S. Application Data

(62) Division of application No. 10/607,043, filed on Jun. 26, 2003, now Pat. No. 7,232,516.

(51) Int. Cl.
*B01J 29/06* (2006.01)
*B01J 20/00* (2006.01)

(52) U.S. Cl. .......................... 502/407; 502/64; 502/66; 502/71

(58) Field of Classification Search ................. 502/64, 502/66, 71, 407
See application file for complete search history.

(56) References Cited

U.S. PATENT DOCUMENTS

| | | | | |
|---|---|---|---|---|
| 5,059,302 | A | * 10/1991 | Weinberg et al. | 208/91 |
| 6,274,533 | B1 | * 8/2001 | Khare | 502/343 |
| 2003/0166465 | A1 | * 9/2003 | Khare | 502/400 |
| 2006/0081499 | A1 | * 4/2006 | Khare | 208/15 |

* cited by examiner

*Primary Examiner*—Elizabeth D Wood
(74) *Attorney, Agent, or Firm*—Hovey Williams LLP (57) ABSTRACT

A desulfurization system employing a system of fluidizable and circulatable solid particles to desulfurize a hydrocarbon-containing fluid in a fluidized bed reactor. The solid particulate system includes solid sorbent particles operable to remove sulfur from the hydrocarbon-containing fluid stream and solid catalyst particles operable to enhance the octane of the resulting desulfurized hydrocarbon-containing fluid stream. The solid particulate system can be circulated between a reactor, regenerator, and reducer, to thereby allow for substantially continuous desulfurization in the reactor.

19 Claims, 3 Drawing Sheets

DESULFURIZATION WITH OCTANE ENHANCEMENT

This application is a Divisional of application Ser. No. 10/607,043, filed Jun. 26, 2003, now U.S. Pat. No. 7,232,516.

BACKGROUND OF THE INVENTION

This invention relates generally to systems for desulfurizing hydrocarbon-containing fluid streams such as cracked gasoline and diesel fuel. In another aspect, the invention concerns compositions that can be used to remove sulfur from hydrocarbon-containing fluid streams with minimal octane loss, or even octane enhancement.

Hydrocarbon-containing fluids such as gasoline and diesel fuels typically contain a quantity of sulfur. High levels of sulfur in such automotive fuels are undesirable because oxides of sulfur present in automotive exhaust may irreversibly poison noble metal catalysts employed in automobile catalytic converters. Emissions from such poisoned catalytic converters may contain high levels of non-combusted hydrocarbons, oxides of nitrogen, and/or carbon monoxide, which, when catalyzed by sunlight, form ground level ozone, more commonly referred to as smog.

Much of the sulfur present in the final blend of most gasolines originates from a gasoline blending component commonly known as "cracked-gasoline." Thus, reduction of sulfur levels in cracked-gasoline will inherently serve to reduce sulfur levels in most gasolines, such as, automobile gasolines, racing gasolines, aviation gasolines, boat gasolines, and the like. Many conventional processes exist for removing sulfur from cracked-gasoline. However, most conventional sulfur removal processes, such as hydrodesulfurization, tend to saturate olefins and aromatics in the cracked-gasoline and thereby reduce its octane number (both research and motor octane number). Thus, there is a need for a process wherein desulfurization of cracked-gasoline is achieved while the octane number is maintained or even enhanced.

SUMMARY OF THE INVENTION

Accordingly, it is an object of the present invention to provide a novel process for removing sulfur from a hydrocarbon-containing fluid stream while minimizing octane loss or even enhancing the octane of the resulting desulfurized fluid stream.

A further object of the present invention is to provide a novel solid particulate system which can be employed in fluidized bed reactors and readily circulated between various vessels without significant attrition of the particles.

A still further object of the present invention is to provide a hydrocarbon desulfurization system which minimizes hydrogen consumption while providing improved sulfur removal and enhanced octane.

It should be noted that the above-listed objects need not all be accomplished by the invention claimed herein and other objects and advantages of the invention will be apparent from the following description of the preferred embodiments and appended claims.

Accordingly, in one embodiment of the present invention, there is provided a desulfurization process comprising the steps of: (a) contacting a solid particulate system with a hydrocarbon-containing fluid stream in a desulfurization zone under desulfurization conditions, wherein said solid particulate system comprises a sorbent and a catalyst, wherein said sorbent is capable of removing sulfur from the hydrocarbon-containing fluid stream at the desulfurization conditions, wherein said catalyst is capable of increasing the octane of the hydrocarbon-containing fluid stream at the desulfurization conditions; (b) contacting said solid particulate system with an oxygen-containing regeneration stream in a regeneration zone under regeneration conditions; and (c) contacting said solid particulate system with a hydrogen-containing reducing stream in a reducing zone under reducing conditions.

In another embodiment of the present invention, there is provided a desulfurization process comprising the steps of: (a) contacting a first portion of a solid particulate system with a hydrocarbon-containing fluid stream in a first fluidized bed reactor under desulfurization conditions sufficient to remove sulfur from said hydrocarbon-containing fluid stream, wherein said solid particulate system comprises a plurality of individual sorbent particles and a plurality of individual catalyst particles, wherein each of said sorbent particles comprises zinc oxide and a promoter metal component, wherein each of said catalyst particles comprises a zeolite capable of isomerization and cracking at least some of the components in the hydrocarbon-containing fluid stream at said desulfurization conditions, wherein the weight ratio of said sorbent particles to said catalyst particles is in the range of from about 100:1 to about 4:1; and (b) simultaneously with step (a), contacting a second portion of the solid particulate system with an oxygen-containing regeneration stream in a second fluidized bed reactor under regeneration conditions sufficient to remove coke from said catalyst particles and remove sulfur from said sorbent particles.

In a further embodiment of the present invention, there is provided a solid particulate system comprising an unbound mixture of sorbent particles and catalyst particles. The sorbent particles comprise zinc oxide and a promoter metal component. The catalyst particles comprise a zeolite having a largest ring with at least 10 T-atoms. The weight ratio of the sorbent particles to the catalyst particles is in the range of from about 100:1 to about 4:1. The mean particle sizes of the sorbent particles and the catalyst particles are both in the range of from about 20 to about 200 microns.

DETAILED DESCRIPTION OF THE PREFERRED EMBODIMENTS

Figure 1:
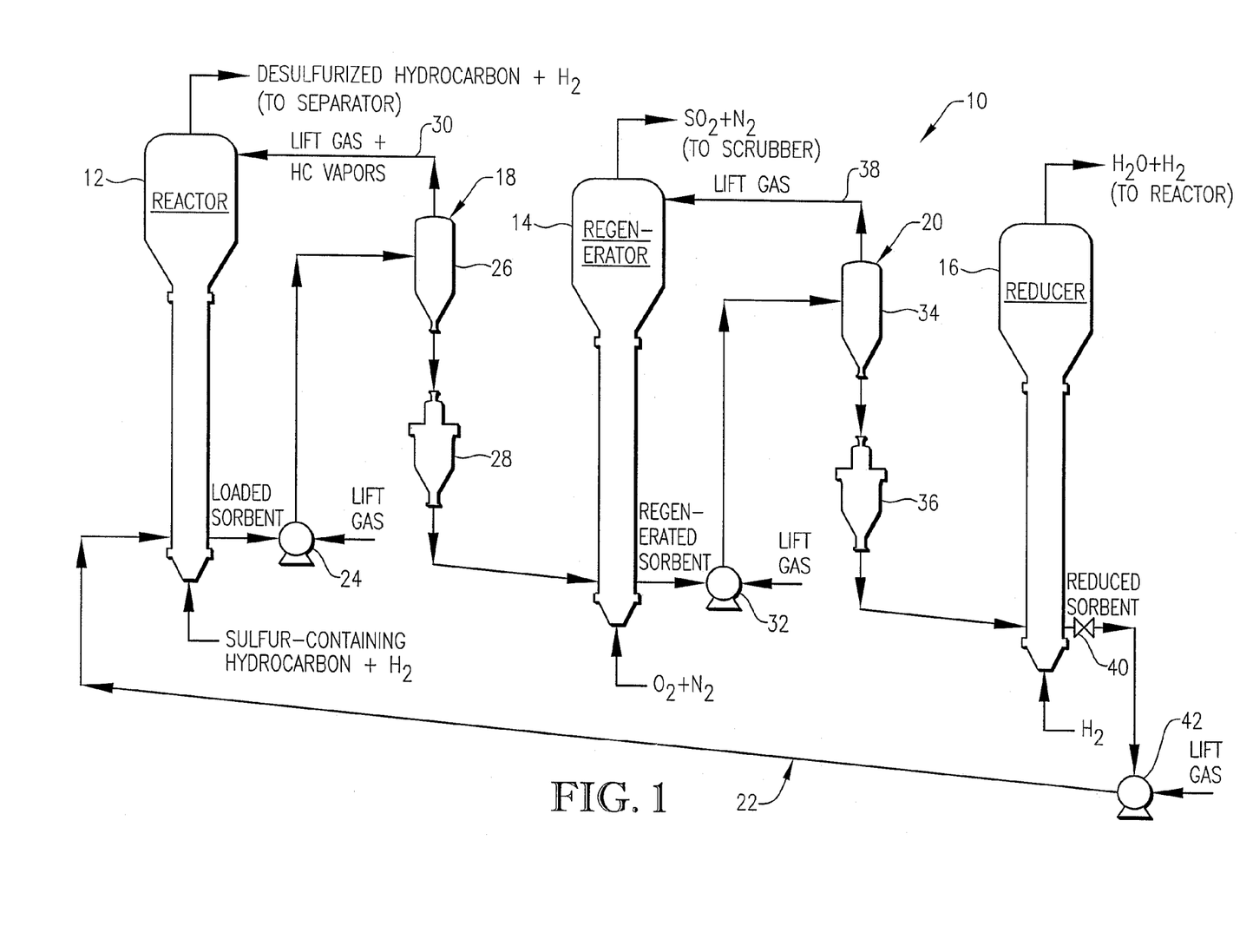
FIG. 1 is a schematic process flow diagram of a desulfurization unit constructed in accordance with the principals of the present invention, particularly illustrating the circulation of a regenerable solid particulate system through the reactor, regenerator, and reducer.

Referring initially to FIG. 1, a desulfurization unit 10 is illustrated as generally comprising a fluidized bed reactor 12, a fluidized bed regenerator 14, and a fluidized bed reducer 16. A system of finely divided solid particles is circulated in desulfurization unit 10 to provide for substantially continuous sulfur removal (in reactor 12) from a sulfur-containing hydrocarbon, such as cracked-gasoline or diesel fuel. The finely divided solid particulate system employed in desulfurization unit 10 preferably comprises an unbound mixture of a plurality of individual sorbent particles and a plurality of individual catalyst particles. Although it is within the ambit of one embodiment of the present invention for the sorbent and catalyst to be bound together in the same particle, it is preferred for the sorbent particles and the catalyst particles to be discrete solid particles that can move freely relative to one another. Preferably, the weight ratio of the sorbent particles to the catalyst particles in the solid particulate system is in the range of from about 100:1 to about 4:1, more preferably of from about 40:1 to about 5:1, and most preferably from 20:1 to 10:1.

The solid catalyst particles of the solid particulate system employed in desulfurization unit 10 can be any sufficiently fluidizable, circulatable, and regenerable solid acid catalyst having sufficient isomerization activity, cracking activity, attrition resistance, and coke resistance at the operating conditions of desulfurization unit 10. The catalyst particles are preferably more acidic than about −1 on the Hammett scale, more preferably the catalyst particles are more acidic than about −3 on the Hammett scale, and most preferably the catalyst particles are more acidic than −6 on the Hammett scale. The catalyst particles preferably comprise a zeolite in an amount in the range of from about 5 to about 50 weight percent, with the balance being a conventional binder system such as clay (e.g., kaolin clay) or a mixture of clay and a binding alumina. Most preferably, the catalyst particles comprise the zeolite in an amount in the range of from 10 to 30 weight percent. It is preferred for the largest ring of the zeolite employed in the catalyst particles of the present invention to have at least 8 T-atoms. More preferably, the largest ring of the zeolite has at least 10 T-atoms, still more preferably the largest ring of the zeolite has 10 to 12 T-atoms, and most preferably the largest ring of the zeolite has 10 T-atoms.

It is further preferred for the zeolite to have a channel dimensionality of 3. It is preferred for the zeolite employed in the solid particulate system of the present invention to have a framework type code selected from the group consisting of AEL, AET, AFI, AFO, AFR, AFS, AFY, AHT, ASV, ATO, ATS, BEA, BEC, BOG, BPH, CAN, CFI, CGF, CGS, CLO, CON, CZP, DAC, DFO, DON, EMT, EPI, EUO, FAU, FER, GME, GON, HEU, IFR, ISV, LAU, LTL, MAZ, MEI, MEL, MFI, MFS, MOR, MTT, MTW, MWW, NES, OFF, OSI, OSO, PAR, RON, SAO, SBE, SBS, SBT, SFE, SFF, SFG, STF, STI, TER, TON, VET, VFI, WEI, and WEN. More preferably, the zeolite has a framework type code selected from the group consisting of AFS, AFY, BEA, BEC, BHP, CGS, CLO, CON, DFO, EMT, FAU, GME, ISV, MEI, MEL, MFI, SAO, SBS, SBT, and WEN. Still more preferably the zeolite has a MFI framework type code. The above-listed framework type codes follow the rules set up by an IUPAC Commission on Zeolite Nomenclature in 1978, as outlined in R. M. Barrer, "Chemical Nomenclature and Formulation of Compositions of Synthetic and Natural Zeolites", *Pure Appl. Chem.* 51, 1091(1979). Further information on framework type codes is available in Ch. Baerlocher, W. M. Meier, D. H. Olson, *Atlas of Zeolite Framework Types,* 5th ed., Elsevier, Amsterdam (2001), the entire disclosure of which is hereby incorporated by reference. Most preferably, the zeolite of the catalyst particles is ZSM-5 that has been ion exchanged and calcined so that it exists in its hydrogen form (i.e., H-ZSM-5).

It is also preferred that the zeolite have a high silica ($SiO_2$) to alumina ($Al_2O_3$) molar ratio. Usually the zeolite silica to alumina molar ratio will be within a range of about 10 to about 10,000 and preferably, within a ratio of about 15 to about 5,000. Most preferably, for best octane enhancement, the silica to alumina molar ratio will be within a range of 20 to 1000.

The solid sorbent particles of the solid particulate system employed in desulfurization unit 10 can be any sufficiently fluidizable, circulatable, and regenerable zinc oxide-based composition having sufficient desulfurization activity and sufficient attrition resistance at the conditions in desulfurization unit 10. A description of such a sorbent composition is provided in U.S. Pat. Nos. 6,429,170 and 6,864,215, the entire disclosures of which are incorporated herein by reference.

In fluidized bed reactor 12, a hydrocarbon-containing fluid stream is passed upwardly through a fluidized bed of the solid particulate system so that the reduced solid sorbent and catalyst particles present in reactor 12 are contacted with the fluid stream. The reduced solid sorbent particles contacted with the hydrocarbon-containing stream in reactor 12 preferably initially (i.e., immediately prior to contacting with the hydrocarbon-containing fluid stream) comprise zinc oxide and a reduced-valence promoter metal component. Though not wishing to be bound by theory, it is believed that the reduced-valence promoter metal component of the reduced solid sorbent particles facilitates the removal of sulfur from the hydrocarbon-containing stream, while the zinc oxide operates as a sulfur storage mechanism via its conversion to zinc sulfide.

The reduced-valence promoter metal component of the reduced solid sorbent particles preferably comprises a promoter metal selected from a group consisting of nickel, cobalt, iron, manganese, tungsten, silver, gold, copper, platinum, zinc, tin, ruthenium, molybdenum, antimony, vanadium, iridium, chromium, palladium. More preferably, the reduced-valence promoter metal component comprises nickel as the promoter metal. As used herein, the term "reduced-valence" when describing the promoter metal component, shall denote a promoter metal component having a valence which is less than the valence of the promoter metal component in its common oxidized state. More specifically, the reduced solid sorbent particles employed in reactor 12 should include a promoter metal component having a valence which is less than the valence of the promoter metal component of the regenerated (i.e., oxidized) solid sorbent particulates exiting regenerator 14. Most preferably, substantially all of the promoter metal component of the reduced solid sorbent particulates has a valence of zero.

In a preferred embodiment of the present invention, the reduced-valence promoter metal component comprises, consists of, or consists essentially of, a substitutional solid metal solution characterized by the formula: $M_A Zn_B$, wherein M is the promoter metal and A and B are each numerical values in the range of from 0.01 to 0.99. In the above formula for the substitutional solid metal solution, it is preferred for A to be in the range of from about 0.70 to about 0.97, and most preferably in the range of from about 0.85 to about 0.95. It is further preferred for B to be in the range of from about 0.03 to about 0.30, and most preferably in the range of from about 0.05 to 0.15. Preferably, B is equal to (1−A).

Substitutional solid solutions have unique physical and chemical properties that are important to the chemistry of the sorbent composition described herein. Substitutional solid solutions are a subset of alloys that are formed by the direct substitution of the solute metal for the solvent metal atoms in the crystal structure. For example, it is believed that the substitutional solid metal solution ($M_A Zn_B$) found in the reduced solid sorbent particles is formed by the solute zinc metal atoms substituting for the solvent promoter metal atoms. There are three basic criteria that favor the formation of substitutional solid solutions: (1) the atomic radii of the two elements are within 15 percent of each other; (2) the crystal structures of the two pure phases are the same; and (3) the electronegativities of the two components are similar. The promoter metal (as the elemental metal or metal oxide) and zinc oxide employed in the solid sorbent particles described herein preferably meet at least two of the three criteria set forth above. For example, when the promoter metal is nickel, the first and third criteria, are met, but the second is not. The nickel and zinc metal atomic radii are within 10 percent of each other and the electronegativities are similar. However, nickel oxide (NiO) preferentially forms a cubic crystal structure, while zinc oxide (ZnO) prefers a hexagonal crystal structure. A nickel zinc solid solution retains the cubic structure of the nickel oxide. Forcing the zinc oxide to reside in the cubic structure increases the energy of the phase, which limits the amount of zinc that can be dissolved in the nickel oxide structure. This stoichiometry control manifests itself microscopically in a 92:8 nickel zinc solid solution ($Ni_{0.92}Zn_{0.08}$) that is formed during reduction and microscopically in the repeated regenerability of the solid sorbent particles.

In addition to zinc oxide and the reduced-valence promoter metal component, the reduced solid sorbent particles employed in reactor 12 may further comprise a porosity enhancer and an aluminate. The aluminate is preferably a promoter metal-zinc aluminate substitutional solid solution. The promoter metal-zinc aluminate substitutional solid solution can be characterized by the formula: $M_ZZn_{(1-Z)}Al_2O_4$, wherein Z is a numerical value in the range of from 0.01 to 0.99. The porosity enhancer, when employed, can be any compound which ultimately increases the macroporosity of the solid sorbent particles. Preferably, the porosity enhancer is perlite. The term "perlite" as used herein is the petrographic term for a siliceous volcanic rock which naturally occurs in certain regions throughout the world. The distinguishing feature, which sets it apart from other volcanic minerals, is its ability to expand four to twenty times its original volume when heated to certain temperatures. When heated above 1600° F., crushed perlite expands due to the presence of combined water with the crude perlite rock. The combined water vaporizes during the heating process and creates countless tiny bubbles in the heat softened glassy particles. It is these diminutive glass sealed bubbles which account for its light weight. Expanded perlite can be manufactured to weigh as little as 2.5 lbs per cubic foot. Typical chemical analysis properties of expanded perlite are: silicon dioxide 73%, aluminum oxide 17%, potassium oxide 5%, sodium oxide 3%, calcium oxide 1%, plus trace elements. Typical physical properties of expanded perlite are: softening point 1,600-2,000° F., fusion point 2,300° F.-2,450° F., pH 6.6-6.8, and specific gravity 2.2-2.4. The term "expanded perlite" as used herein refers to the spherical form of perlite which has been expanded by heating the perlite siliceous volcanic rock to a temperature above 1,600° F. The term "particulate expanded perlite" or "milled perlite" as used herein denotes that form of expanded perlite which has been subjected to crushing so as to form a particulate mass wherein the particle size of such mass is comprised of at least 97 percent of particles having a size of less than two microns. The term "milled expanded perlite" is intended to mean the product resulting from subjecting expanded perlite particles to milling or crushing.

The reduced solid sorbent particles initially contacted with the hydrocarbon-containing fluid stream in reactor 12 can comprise zinc oxide, the reduced-valence promoter metal component ($M_AZn_B$), the porosity enhancer (PE), and the promoter metal-zinc aluminate ($M_ZZn_{(1-Z)}Al_2O_4$) in the ranges provided below in Table 1.

TABLE 1

Components of the Reduced Solid Sorbent Particulates

| Range | ZnO (wt %) | $M_AZn_B$ (wt %) | PE (wt %) | $M_ZZn_{(1-Z)}Al_2O_4$ (wt %) |
|---|---|---|---|---|
| Preferred | 5-80 | 5-80 | 2-50 | 1-50 |
| More Preferred | 20-60 | 20-60 | 5-30 | 5-30 |
| Most Preferred | 30-50 | 30-40 | 10-20 | 10-20 |

The physical properties of the sorbent and catalyst particles of the solid particulate system can significantly affect the particulate system's suitability for use in desulfurization unit 10. Key physical properties of the sorbent and catalyst particles include, for example, particle shape, particle size, particle density, and resistance to attrition. The particles of the solid particulate system (i.e., the mixture of sorbent particles and catalyst particles) employed in desulfurization unit 10 preferably comprise substantially microspherical particles having a mean particle size in the range of from about 20 to about 200 microns, more preferably in the range of from about 40 to about 150 microns, and most preferably in the range of from about 50 to about 100 microns. As used herein, the term "finely divided" denotes particles having a mean particle size less than 500 microns.

The average density of the sorbent particles in the solid particulate system is preferably in the range of from about 0.5 to about 1.5 grams per cubic centimeter (g/cc), more preferably in the range of from about 0.8 to about 1.3 g/cc, and most preferably in the range of from 0.9 to 1.2 g/cc. The average density of the catalyst particles in the solid particulate system is preferably within about 50 percent of the average density of the sorbent particulates, more preferably within about 25 percent of the average density of the sorbent particulates. The particle size and density of the sorbent and catalyst particles preferably qualify the particles of the solid particulate system as Group A solids under the Geldart group classification system described in *Powder Technol.*, 7, 285-292 (1973). The sorbent and catalyst particles of the solid particulate system preferably have high resistance to attrition. As used herein, the term "attrition resistance" denotes a measure of a particle's resistance to size reduction under controlled conditions of turbulent motion. The attrition resistance of a particle can be quantified using the jet cup attrition test, similar to the Davison Index. The Jet Cup Attrition Index represents the weight percent of the over 44 micrometer particle size fraction which is reduced to particle sizes of less than 37 micrometers under test conditions and involves screening a 5 gram sample of solid particles to remove particles in the 0 to 44 micrometer size range. The particles above 44 micrometers are then subjected to a tangential jet of air at a rate of 21 liters per minute introduced through a 0.0625 inch orifice fixed at the bottom of a specially designed jet cup (1" I.D.×2" height) for a period of 1 hour. The Jet Cup Attrition Index (JCAI) is calculated as follows:

$$JCAI = \frac{\text{Wt. of 0-37 Micrometer Formed During Test}}{\text{Wt. of Original} + 44 \text{ Micrometer Fraction Being Tested}} \times 100 \times CF$$

The Correction Factor (CF) (presently 0.30) is determined by using a known calibration standard to adjust for differences in jet cup dimensions and wear. The sorbent and catalyst particles employed in the present invention preferably have a Jet Cup Attrition Index value of less than about 30, more preferably less than about 20, and most preferably less than 15.

The hydrocarbon-containing fluid stream contacted with the solid particulate system in reactor 12 preferably comprises a sulfur-containing hydrocarbon and hydrogen. The molar ratio of the hydrogen to the sulfur-containing hydrocarbon charged to reactor 12 is preferably in the range of from about 0.1:1 to about 3:1, more preferably in the range of from about 0.2:1 to about 1:1, and most preferably in the range of from 0.4:1 to 0.8:1. Preferably, the sulfur-containing hydrocarbon is a fluid which is normally in a liquid state at standard temperature and pressure, but which exists in a gaseous state when combined with hydrogen, as described above, and exposed to the desulfurization conditions in reactor 12. The sulfur-containing hydrocarbon preferably can be used as a fuel or a precursor to fuel. Examples of suitable sulfur-containing hydrocarbons include cracked-gasoline, diesel fuels, jet fuels, straight-run naphtha, straight-run distillates, coker gas oil, coker naphtha, alkylates, and straight-run gas oil. More preferably, the sulfur-containing hydrocarbon comprises a hydrocarbon fluid selected from the group consisting of gasoline, cracked-gasoline, diesel fuel, and mixtures thereof. Most preferably, the sulfur-containing hydrocarbon is cracked-gasoline.

As used herein, the term "gasoline" denotes a mixture of hydrocarbons boiling in a range of from about 100° F. to about 400° F., or any fraction thereof. Examples of suitable gasolines include, but are not limited to, hydrocarbon streams in refineries such as naphtha, straight-run naphtha, coker naphtha, catalytic gasoline, visbreaker naphtha, alkylates, isomerate, reformate, and the like, and mixtures thereof.

As used herein, the term "cracked-gasoline" denotes a mixture of hydrocarbons boiling in a range of from about 100° F. to about 400° F., or any fraction thereof, that are products of either thermal or catalytic processes that crack larger hydrocarbon molecules into smaller molecules. Examples of suitable thermal processes include, but are not limited to, coking, thermal cracking, visbreaking, and the like, and combinations thereof. Examples of suitable catalytic cracking processes include, but are not limited to, fluid catalytic cracking, heavy oil cracking, and the like, and combinations thereof. Thus, examples of suitable cracked-gasolines include, but are not limited to, coker gasoline, thermally cracked gasoline, visbreaker gasoline, fluid catalytically cracked gasoline, heavy oil cracked-gasoline and the like, and combinations thereof. In some instances, the cracked-gasoline may be fractionated and/or hydrotreated prior to desulfurization when used as the sulfur-containing fluid in the process in the present invention.

As used herein, the term "diesel fuel" denotes a mixture of hydrocarbons boiling in a range of from about 300° F. to about 750° F., or any fraction thereof. Examples of suitable diesel fuels include, but are not limited to, light cycle oil, kerosene, jet fuel, straight-run diesel, hydrotreated diesel, and the like, and combinations thereof.

The sulfur-containing hydrocarbon described herein as suitable feed in the inventive desulfurization process comprises a quantity of olefins, aromatics, and sulfur, as well as paraffins and naphthenes. The amount of olefins in gaseous cracked-gasoline is generally in a range of from about 10 to about 35 weight percent olefins based on the total weight of the gaseous cracked-gasoline. The amount of aromatics in gaseous cracked-gasoline is generally in a range of from about 20 to about 40 weight percent aromatics based on the total weight of the gaseous cracked-gasoline. The amount of atomic sulfur in the sulfur-containing hydrocarbon fluid, preferably cracked-gasoline, suitable for use in the inventive desulfurization process is generally greater than about 50 parts per million by weight (ppmw) of the sulfur-containing hydrocarbon fluid, more preferably in a range of from about 100 ppmw atomic sulfur to about 10,000 ppmw atomic sulfur, and most preferably from 150 ppmw atomic sulfur to 500 ppmw atomic sulfur. It is preferred for at least about 50 weight percent of the atomic sulfur present in the sulfur-containing hydrocarbon fluid employed in the present invention to be in the form of organosulfur compounds. More preferably, at least about 75 weight percent of the atomic sulfur present in the sulfur-containing hydrocarbon fluid is in the form of organosulfur compounds, and most preferably at least 90 weight percent of the atomic sulfur is in the form of organosulfur compounds. As used herein, "sulfur" used in conjunction with "ppmw sulfur" or the term "atomic sulfur", denotes the amount of atomic sulfur (about 32 atomic mass units) in the sulfur-containing hydrocarbon, not the atomic mass, or weight, of a sulfur compound, such as an organosulfur compound.

As used herein, the term "sulfur" denotes sulfur in any form normally present in a sulfur-containing hydrocarbon such as cracked-gasoline or diesel fuel. Examples of such sulfur which can be removed from a sulfur-containing hydrocarbon fluid through the practice of the present invention include, but are not limited to, hydrogen sulfide, carbonal sulfide (COS), carbon disulfide ($CS_2$), mercaptans (RSH), organic sulfides (R—S—R), organic disulfides (R—S—S—R), thiophene, substitute thiophenes, organic trisulfides, organic tetrasulfides, benzothiophene, alkyl thiophenes, alkyl benzothiophenes, alkyl dibenzothiophenes, and the like, and combinations thereof, as well as heavier molecular weights of the same which are normally present in sulfur-containing hydrocarbons of the types contemplated for use in the desulfurization process of the present invention, wherein each R can by an alkyl, cycloalkyl, or aryl group containing one to 10 carbon atoms.

As used herein, the term "fluid" denotes gas, liquid, vapor, and combinations thereof.

As used herein, the term "gaseous" denotes the state in which the sulfur-containing hydrocarbon fluid, such as cracked-gasoline or diesel fuel, is primarily in a gas or vapor phase.

In fluidized bed reactor 12, the solid particulate system is contacted with the upwardly flowing gaseous hydrocarbon-containing fluid stream under a set of desulfurization conditions sufficient to produce a desulfurized hydrocarbon, sulfur-loaded sorbent particles, and coked catalyst particles. The flow of the hydrocarbon-containing fluid stream is sufficient to fluidize the bed of solid particles located in reactor 12. The desulfurization conditions in reactor 12 include temperature, pressure, weighted hourly space velocity (WHSV), and superficial velocity. The preferred ranges for such desulfurization conditions are provided below in Table 2.

TABLE 2

Desulfurization Conditions

| Range | Temp. (° F.) | Press. (psig) | WHSV ($hr^{-1}$) | Superficial Vel. (ft/s) |
|---|---|---|---|---|
| Preferred | 250-1200 | 25-750 | 1-20 | 0.25-5 |
| More Preferred | 500-1000 | 100-400 | 2-12 | 0.5-2.5 |
| Most Preferred | 700-850 | 150-250 | 3-8 | 1.0-1.5 |

When the reduced solid sorbent particles are contacted with the hydrocarbon-containing stream in reactor 12 under desulfurization conditions, sulfur compounds, particularly organosulfur compounds, present in the hydrocarbon-containing fluid stream are removed from such fluid stream. At least a portion of the sulfur removed from the hydrocarbon-containing fluid stream is employed to convert at least a portion of the zinc oxide of the reduced solid sorbent particles into zinc sulfide.

In contrast to many conventional sulfur removal processes (e.g., hydrodesulfurization), it is preferred that substantially none of the sulfur in the sulfur-containing hydrocarbon fluid is converted to, and remains as, hydrogen sulfide during desulfurization in reactor 12. Rather, it is preferred that the fluid effluent from reactor 12 (generally comprising the desulfurized hydrocarbon and hydrogen) comprises less than the amount of hydrogen sulfide, if any, in the fluid feed charged to reactor 12 (generally comprising the sulfur-containing hydrocarbon and hydrogen). The fluid effluent from reactor 12 preferably contains less than about 50 weight percent of the amount of sulfur in the fluid feed charged to reactor 12, more preferably less than about 20 weight percent of the amount of sulfur in the fluid feed, and most preferably less than five weight percent of the amount of sulfur in the fluid feed. It is preferred for the total sulfur content of the fluid effluent from reactor 12 to be less than about 50 parts per million by weight (ppmw) of the total fluid effluent, more preferably less than about 30 ppmw, still more preferably less than about 15 ppmw, and most preferably less than 10 ppmw.

When the catalyst particles are contacted with the hydrocarbon-containing stream in reactor 12 under desulfurization conditions, it is preferred for the following reactions to take place: mild cracking of C7+ olefins, dealkylation of naphthenes, and isomerization of olefins from the alpha position to the beta positions and isomerization of linear olefins to branched olefins. The reactions catalyzed by the catalyst particles in reactor 12 provide an increase in the road octane of the resulting desulfurized product versus desulfurization with a solid particulate system employing no catalyst particles. As used herein, the terms "octane" and "road octane" shall denote the octane of a fuel calculated by summing the research octane number (RON) and the motor octane number (MON) and dividing the sum of the MON and RON by 2.

After desulfurization in reactor 12, the desulfurized hydrocarbon fluid, preferably desulfurized cracked-gasoline, can thereafter be separated and recovered from the fluid effluent and preferably liquified. The liquification of such desulfurized hydrocarbon fluid can be accomplished by any method or manner known in the art. The resulting liquified, desulfurized hydrocarbon preferably comprises less than about 50 weight percent of the amount of sulfur in the sulfur-containing hydrocarbon (e.g., cracked-gasoline) charged to the reaction zone, more preferably less than about 20 weight percent of the amount of sulfur in the sulfur-containing hydrocarbon, and most preferably less than five weight percent of the amount of sulfur in the sulfur-containing hydrocarbon. The desulfurized hydrocarbon preferably comprises less than about 50 ppmw sulfur, more preferably less than about 30 ppmw sulfur, still more preferably less than about 15 ppmw sulfur, and most preferably less than 10 ppmw sulfur. It is further preferred for the desulfurized hydrocarbon to have an octane number that is at least 0.01 greater than the octane of the original sulfur-containing hydrocarbon charged to the reaction zone, more preferably 0.05 greater, still more preferably 0.1 greater, even more preferably 0.3 greater, and most preferably 0.5 greater. Another significant aspect of the present invention is that the octane of the sulfur-containing hydrocarbon is increased with minimal liquid volume loss. Liquid volume loss is typically attributable to the conversion of the hydrocarbon-containing (e.g., cracked-gasoline) feed to light hydrocarbons that exist in a gaseous state at standard temperature and pressure (STP). Preferably, in order to maximize gasoline volume, at least 95 percent of the liquid volume of the hydrocarbon feed is retained, more preferably at least 97 percent, still more preferably at least 98 percent, and most preferably at least 99 percent. Alternatively, in order to maximize light olefin production, retention of lower percentages of the liquid volume in the hydrocarbon can be preferred.

After desulfurization and octane enhancement in reactor 12, at least a portion of the solid particulate system (i.e., the sulfur-loaded sorbent particles and the coked catalyst particles) are transported to regenerator 14 via a first transport assembly 18. In regenerator 14, the solid particulate system is contacted with an oxygen-containing regeneration stream. The oxygen-containing regeneration stream preferably comprises at least one mole percent oxygen with the remainder being a gaseous diluent. More preferably, the oxygen-containing regeneration stream comprises in the range of from about one to about 50 mole percent oxygen and in the range of from about 50 to about 95 mole percent nitrogen, still more preferable in the range of from about two to about 20 mole percent oxygen and in the range of from about 70 to about 90 mole percent nitrogen, and most preferably in the range of from three to 10 mole percent oxygen and in the range of from 75 to 85 mole percent nitrogen.

The regeneration conditions in regenerator 14 are sufficient to convert at least a portion of the zinc sulfide of the sulfur-loaded sorbent particles into zinc oxide via contacting with the oxygen-containing regeneration stream, thereby removing sulfur from the sorbent particles. In addition, the regeneration conditions are sufficient to remove at least a portion of the coke from the catalyst particles. The preferred ranges for such regeneration conditions are provided below in Table 3.

TABLE 3

Regeneration Conditions

| Range | Temp. (° F.) | Press. (psig) | Superficial Vel. (ft/s) |
|---|---|---|---|
| Preferred | 500-1500 | 10-250 | 0.5-10 |
| More Preferred | 700-1200 | 20-150 | 1.0-5.0 |
| Most Preferred | 900-1100 | 30-75 | 2.0-2.5 |

When the sulfur-loaded solid sorbent particles are contacted with the oxygen-containing regeneration stream under the regeneration conditions described above, at least a portion of the promoter metal component is oxidized to form an oxidized promoter metal component. Preferably, in regenerator 14 the substitutional solid metal solution ($M_A Zn_B$) and/or sulfided substitutional solid metal solution ($M_A Zn_B S$) of the sulfur-loaded sorbent is converted to a substitutional solid metal oxide solution characterized by the formula: $M_X Zn_Y O$, wherein M is the promoter metal and X and Y are each numerical values in the range of from 0.01 to about 0.99. In the above formula, it is preferred for X to be in the range of from about 0.5 to about 0.9 and most preferably from 0.6 to 0.8. It is further preferred for Y to be in the range of from about 0.1 to about 0.5, and most preferably from 0.2 to 0.4. Preferably, Y is equal to (1−X).

The regenerated solid particulate system exiting regenerator 14 preferably comprises substantially sulfur-free sorbent particles and substantially coke-free catalyst particles. The substantially sulfur-free sorbent particles can comprise zinc oxide, the oxidized promoter metal component ($M_X Zn_Y O$), the porosity enhancer (PE), and the promoter metal-zinc aluminate ($M_ZZn_{(1-Z)}Al_2O_4$) in the ranges provided below in Table 4.

TABLE 4

Components of the Regenerated Solid Sorbent Particulates

| Range | ZnO (wt %) | $M_XZn_YO$ (wt %) | PE (wt %) | $M_ZZn_{(1-Z)}Al_2O_4$ (wt %) |
|---|---|---|---|---|
| Preferred | 5-80 | 5-70 | 2-50 | 1-50 |
| More Preferred | 20-60 | 15-60 | 5-30 | 5-30 |
| Most Preferred | 30-50 | 20-40 | 10-20 | 10-20 |

After regeneration in regenerator 14, the regenerated solid particulate system is transported to reducer 16 via a second transport assembly 20. In reducer 16, the regenerated solid particles are contacted with a hydrogen-containing reducing stream. The hydrogen-containing reducing stream preferably comprises at least about 50 mole percent hydrogen with the remainder being cracked hydrocarbon products such as, for example, methane, ethane, and propane. More preferably, the hydrogen-containing reducing stream comprises about 70 mole percent hydrogen, and most preferably at least 80 mole percent hydrogen. The reducing conditions in reducer 16 are sufficient to reduce the valence of the oxidized promoter metal component of the regenerated solid sorbent particles. The preferred ranges for such reducing conditions are provided below in Table 5.

TABLE 5

Reducing Conditions

| Range | Temp. (° F.) | Press. (psig) | Superficial Vel. (ft/s) |
|---|---|---|---|
| Preferred | 250-1250 | 25-750 | 0.1-4.0 |
| More Preferred | 600-1000 | 100-400 | 0.2-2.0 |
| Most Preferred | 750-850 | 150-250 | 0.3-1.0 |

When the regenerated solid sorbent particles are contacted with the hydrogen-containing reducing stream in reducer 16 under the reducing conditions described above, at least a portion of the oxidized promoter metal component is reduced to form the reduced-valence promoter metal component. Preferably, at least a substantial portion of the substitutional solid metal oxide solution ($M_XZn_YO$) is converted to the reduced-valence promoter metal component ($M_AZn_B$).

After the system of solid particulates has been reduced in reducer 16, it can be transported back to reactor 12 via a third transport assembly 22 for recontacting with the hydrocarbon-containing fluid stream in reactor 12.

Referring again to FIG. 1, first transport assembly 18 generally comprises a reactor pneumatic lift 24, a reactor receiver 26, and a reactor lockhopper 28 fluidly disposed between reactor 12 and regenerator 14. During operation of desulfurization unit 10 the sulfur-loaded sorbent particles and coked catalyst particles are continuously withdrawn from reactor 12 and lifted by reactor pneumatic lift 24 from reactor 12 to reactor receiver 18. Reactor receiver 18 is fluidly coupled to reactor 12 via a reactor return line 30. The lift gas used to transport the solid particles from reactor 12 to reactor receiver 26 is separated from the solid particles in reactor receiver 26 and returned to reactor 12 via reactor return line 30. Reactor lockhopper 26 is operable to transition the solid particles from the high pressure hydrocarbon environment of reactor 12 and reactor receiver 26 to the low pressure oxygen environment of regenerator 14. To accomplish this transition, reactor lockhopper 28 periodically receives batches of the solid particles from reactor receiver 26, isolates the particles from reactor receiver 26 and regenerator 14, and changes the pressure and composition of the environment surrounding the particles from a high pressure hydrocarbon environment to a low pressure inert (e.g., nitrogen) environment. After the environment of the solid particles has been transitioned, as described above, the particles are batch-wise transported from reactor lockhopper 28 to regenerator 14. Because the solid particles are continuously withdrawn from reactor 12 but processed in a batch mode in reactor lockhopper 28, reactor receiver 26 functions as a surge vessel wherein the solid particles continuously withdrawn from reactor 12 can be accumulated between transfers of the particles from reactor receiver 26 to reactor lockhopper 28. Thus, reactor receiver 26 and reactor lockhopper 28 cooperate to transition the flow of the solid particles between reactor 12 and regenerator 14 from a continuous mode to a batch mode.

Second transport assembly 20 generally comprises a regenerator pneumatic lift 32, a regenerator receiver 34, and a regenerator lockhopper 36 fluidly disposed between regenerator 14 and reducer 16. During operation of desulfurization unit 10 the regenerated sorbent and catalyst particles are continuously withdrawn from regenerator 14 and lifted by regenerator pneumatic lift 32 from regenerator 14 to regenerator receiver 34. Regenerator receiver 34 is fluidly coupled to regenerator 14 via a regenerator return line 38. The lift gas used to transport the regenerated particles from regenerator 14 to regenerator receiver 34 is separated from the regenerated particles in regenerator receiver 34 and returned to regenerator 14 via regenerator return line 38. Regenerator lockhopper 36 is operable to transition the regenerated particles from the low pressure oxygen environment of regenerator 14 and regenerator receiver 34 to the high pressure hydrogen environment of reducer 16. To accomplish this transition, regenerator lockhopper 36 periodically receives batches of the regenerated particles from regenerator receiver 34, isolates the regenerated particles from regenerator receiver 34 and reducer 16, and changes the pressure and composition of the environment surrounding the regenerated particles from a low pressure oxygen environment to a high pressure hydrogen environment. After the environment of the regenerated particles has been transitioned, as described above, the regenerated particles are batch-wise transported from regenerator lockhopper 36 to reducer 16. Because the regenerated sorbent and catalyst particles are continuously withdrawn from regenerator 14 but processed in a batch mode in regenerator lockhopper 36, regenerator receiver 34 functions as a surge vessel wherein the particles continuously withdrawn from regenerator 14 can be accumulated between transfers of the regenerated particles from regenerator receiver 34 to regenerator lockhopper 36. Thus, regenerator receiver 34 and regenerator lockhopper 36 cooperate to transition the flow of the regenerated particles between regenerator 14 and reducer 16 from a continuous mode to a batch mode.

The following examples are intended to be illustrative of the present invention and to teach one of ordinary skill in the art to make and use the invention. These examples are not intended to limit the invention in any way.

EXAMPLES

These examples provide a comparison of desulfurization processes using a base sorbent composition only and desulfurization processes using a solid particulate system comprising both the base sorbent and various catalyst additive compositions. These Examples also show that the entire solid particulate system is regenerable and that none of the solid particulate system needs to be discarded.

Figure 2:
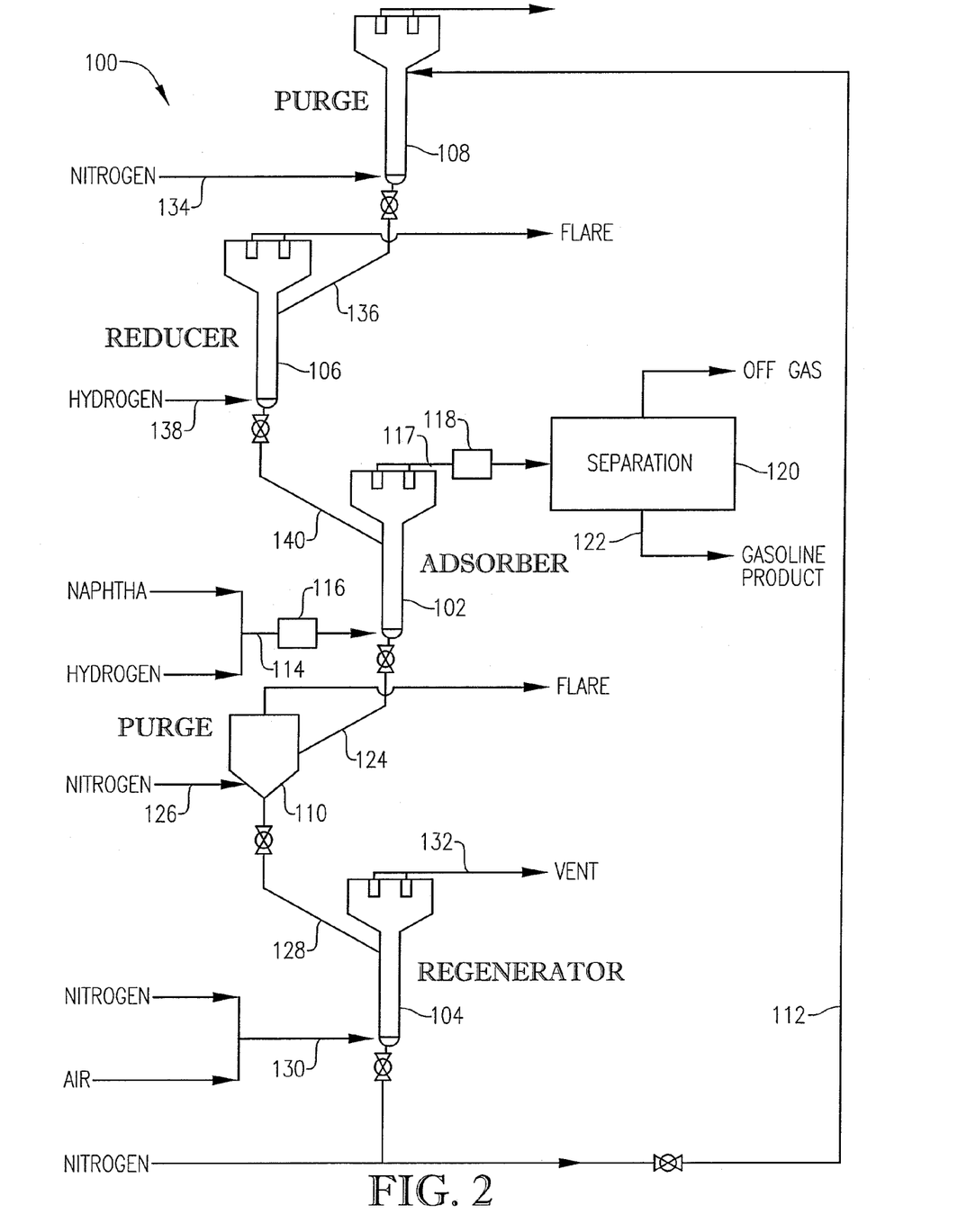
FIG. 2 is a schematic process flow diagram of a pilot plant used to perform desulfurization tests summarized in the EXAMPLES section, below.

Referring to FIG. 2, to generate the data set forth in Examples 1-7, below, a pilot plant 100 was used to test the effectiveness of various sorbent/catalyst systems in desulfurizing a full range naphtha feed (1,000 ppmw sulfur and 24.8 weight percent olefins). Pilot plant 100 included three reactor vessels (i.e., adsorber 102, regenerator 104, and reducer 106) and two purge vessels 108 and 110. The solid particulate system (e.g., sorbent or sorbent plus catalyst) was continuously circulated through these vessels. The solid particles were transported via gravity flow from purge vessel 108 to regenerator 104. The solid particles were transported upwardly from regenerator 104 to purge vessel 108 via a pneumatic lift 112 which employed nitrogen as a lift gas.

Prior to introduction into adsorber 102, the full range naphtha feed was combined with hydrogen in a conduit 114. The feed rate of the naphtha and hydrogen to conduit 114 were 17.4 lb/hr and 16.6 l/min, respectively. The combined feed in conduit 114 was vaporized by heating in heater 116. In adsorber 102, the vaporized feed was contacted with the fluidized sorbent/catalyst particles at a temperature of about 775° F. to 825° F. and a pressure of about 225 psig. The adsorber 102 contained a total of 3.54 pounds of the sorbent/catalyst particulates, and the circulation rate of the sorbent/catalyst particles was 2.57 g/min.

The desulfurized naphtha exiting adsorber 102 via conduit 116 was cooled by chilled water in a heat exchanger 118. The cooled, desulfurized naphtha was then conducted to a separator 120 where the hydrogen and light gasses ($C_{5-}$) were separated from the liquid desulfurized naphtha, with the desulfurized liquid naphtha product being produced via conduit 122.

The sulfur loaded sorbent/catalyst particulate system was continuously transported from adsorber 102 to purge vessel 110 via conduit 124 at a constant rate (i.e., 2.57 g/min). The sulfur loaded sorbent exiting adsorber 102 contained about 6 weight percent sulfur. In purge vessel 110, the sulfided sorbent/catalyst particulate system was purged with nitrogen entering via conduit 126. The purged, sulfur loaded sorbent/catalyst particulate system was transported from purge vessel 110 to regenerator 104 via conduit 128. In regenerator 104, the sorbent/catalyst system was contacted with a mixture of nitrogen and air entering via conduit 130. The nitrogen and air were charged to regenerator 104 at a rate of 100 l/min and 1.7 l/min, respectively. The temperature in regenerator 104 was maintained at about 1,025° F., and the pressure was maintained at about 123 psig. In regenerator 104, sulfur and carbon was burned off of the sorbent/catalyst system, thereby forming a gaseous effluent containing carbon dioxide and sulfur dioxide, which exited regenerator 104 via conduit 132. The regenerated sorbent exiting regenerator 104 contained about 1 weight percent sulfur. Thus, a net sulfur loading (sulfided minus regenerated) of about 5 weight percent was achieved in all the pilot plant tests conducted.

The regenerated sorbent/catalyst system was transported from regenerator 104 to purge vessel 108 via pneumatic lift 112. In purge vessel 108, the regenerated sorbent/catalyst system was purged with nitrogen entering purge vessel 108 via conduit 134. The purged, regenerated sorbent/catalyst particulate system was transported to reducer 106 via conduit 136. In reducer 106, the regenerated sorbent/catalyst system was contacted with a hydrogen stream entering reducer 106 via conduit 138. The hydrogen stream was charged to reducer 106 at a rate of 120 l/min. The temperature and pressure in reducer 106 were maintained at about 750° F. and 225 psig, respectively. After reduction in reducer 106, the reduced sorbent was transported to adsorber 102 via conduit 140 where the desulfurization process was repeated.

As demonstrated in Examples 1-7, various sorbent/catalyst particulate systems were employed in pilot plant 100 in an attempt to quantify the effect of adding various catalysts in various amounts to the base sorbent composition. The base sorbent composition employed in those tests was an unbound mixture of "Generation 2" sorbent particles and "Generation 3" sorbent particles. The Generation 2 and 3 sorbent particles both had a mean particle size of about 70 microns. The base sorbent composition contained about 33 weight percent of the Generation 2 sorbent particles and about 67 weight percent of the Generation 3 sorbent particles. The base microspheres of the Generation 2 sorbent were formed by spray-drying and calcining a mixture of 17.85 weight percent expanded perlite (Sil-Kleer™ 27M, available from Silbrico Corporation, Hodgkins, Ill.), 17.25 weight percent of aluminum hydroxide (Dispal® Aluminum Powder, available from CONDEA Vista Company, Houston, Tex.), and 66 weight percent zinc oxide (available from Zinc Corporation, Monaca, Pa.). The base microspheres of the Generation 3 sorbent were formed by spray-drying and calcining a mixture of 21.6 weight percent expanded perlite (Harborlite™ 205, available from Harborlite Corporation, Antonio, Colo.), 21.0 weight percent aluminum hydroxide (Dispal®), and 57.2 weight percent zinc oxide (from Zinc Corporation). After spray-drying and calcining, the Generation 2 and 3 base microspheres were impregnated with nickel nitrate hexahydrate to a target nickel loading of 18 weight percent nickel metal and calcined to decompose the nitrate. The actual concentration of the nickel metal on the final Generation 2 and 3 sorbent employed in the pilot plant tests was approximately 16.5 weight percent nickel.

Inventive sorbent/catalyst particulate systems were formed by combining various catalysts with the base sorbent composition described above. The catalysts that were combined in various proportions with the base sorbent composition included Z-CAT™ Plus (a high activity catalyst commercially available from Intercat, Sea Girt, N.J.), ISOCAT™ HP (a high selectivity catalyst commercially available from Intercat, Sea Girt, N.J.), and Grace Davison zeolite (a high selectivity catalyst commercially available from Grace Davison Corporation, Baltimore, Md.). The active ingredient in all three of these cracking catalysts was the zeolite H-ZSM-5. The Z-CAT™ Plus catalyst shall hereinafter be referred to as "High Activity Catalyst." The ISOCAT™ HP catalyst shall hereinafter be referred to as "High Selectivity Catalyst #1." The Grace Davison zeolite catalyst shall hereinafter be referred to as "High Selectivity Catalyst #2."

Example 1

(Comparative)

In this example, the above-described pilot plant 100 was used to conduct three comparative desulfurization runs (Runs 1-3) using only the base sorbent. Comparative Run 1 was performed at an adsorber temperature of 775° F. Comparative Run 2 was performed at an adsorber temperature of 800° F. Comparative Run 3 was performed at an adsorber temperature of 825° F. Table 6 shows the results for Comparative Runs 1, 2, and 3

TABLE 6

|  | Base Sorbent Only: | | |
|---|---|---|---|
| Run # | 1 | 2 | 3 |
| Temperature (F.) | 775 | 800 | 825 |
| Product Sulfur (ppmw) | 35.80 | 45.10 | 63.10 |
| Octane Loss | 0.57 | 0.09 | −0.20 |
| Net C3 − (wt %) | 0.10 | 0.18 | 0.20 |
| Net C4 − (wt %) | 0.19 | 0.30 | 0.50 |
| H2 Consumption (calc) (scf/bbl) | 56.80 | 41.50 | 43.90 |
| Delta Reid Vapor Pressure (RVP) | −0.03 | 0.03 | −0.10 |
| Feed API | 52.09 | 51.74 | 51.74 |
| Feed RVP | 5.35 | 5.24 | 5.24 |
| Feed Specific Gravity (SG) | 0.77 | 0.77 | 0.77 |
| Product API | 52.72 | 52.32 | 51.98 |
| Product RVP | 5.32 | 5.27 | 5.14 |
| Product SG | 0.77 | 0.77 | 0.77 |
| Vol % Loss | 0.00 | 0.00 | 0.36 |
| % Vol Retained | 100.00 | 100.00 | 99.64 |

Example 2

(5% High Activity)

In this example, three test runs (Runs 4-6) were performed with 5 weight percent of the High Activity Catalyst being added to the base sorbent system. Test Runs 4, 5, and 6 were conducted at adsorber temperatures of 775° F., 800° F., and 825° F., respectively. Table 7 shows the results for Test Runs 4, 5, and 6, as well as Comparative Runs 1, 2 and 3 which were conducted at the same temperatures.

TABLE 7

|  | Base Sorbent Only: | | | Sorbent + 5 wt % Hi Activity Catalyst: | | |
|---|---|---|---|---|---|---|
| Run # | 1 | 2 | 3 | 4 | 5 | 6 |
| Temp (F.) | 775 | 800 | 825 | 775 | 800 | 825 |
| Prod Sulfur (ppmw) | 35.80 | 45.10 | 63.10 | 36.40 | 47.20 | 58.20 |
| Octane Loss | 0.57 | 0.09 | −0.20 | −0.69 | −1.10 | −1.25 |
| Delta Octane (from Base) |  |  |  | 1.26 | 1.19 | 1.05 |
| Net C3− (wt %) | 0.10 | 0.18 | 0.20 | 1.40 | 1.66 | 2.10 |
| Net C4− (wt %) | 0.19 | 0.30 | 0.50 | 3.65 | 4.31 | 5.40 |
| H2 Consump (calc) (scf/bbl) | 56.80 | 41.50 | 43.90 | 77.10 | 57.60 | 58.00 |
| Delta RVP | −0.03 | 0.03 | −0.10 | 0.40 | 0.69 | 0.93 |
| Feed API | 52.09 | 51.74 | 51.74 | 52.52 | 51.98 | 52.32 |
| Feed RVP | 5.35 | 5.24 | 5.24 | 5.41 | 5.24 | 5.33 |
| Feed SG | 0.77 | 0.77 | 0.77 | 0.77 | 0.77 | 0.77 |
| Product API | 52.72 | 52.32 | 51.98 | 54.01 | 54.22 | 55.17 |
| Product RVP | 5.32 | 5.27 | 5.14 | 5.81 | 5.93 | 6.26 |
| Product SG | 0.77 | 0.77 | 0.77 | 0.76 | 0.76 | 0.76 |
| Vol % Loss | 0.00 | 0.00 | 0.36 | 2.87 | 3.14 | 3.93 |
| % Vol Retained | 100.00 | 100.00 | 99.64 | 97.13 | 96.86 | 96.07 |
| % Vol Retained × Delta Octane |  |  |  | 122.38 | 115.26 | 100.87 |
| % Vol Loss per Octane Gain Over Base |  |  |  | 2.28 | 2.64 | 3.74 |
| Octane Gain Per % Vol Lost |  |  |  | 0.44 | 0.38 | 0.27 |

Example 3

(10% High Activity)

In this Example, two Test Runs (7 and 8) were performed with 10 weight percent of the High Activity Catalyst being added to the base sorbent system. Test Runs 7 and 8 were performed at adsorber temperatures of 775° F. and 825° F. Table 8 shows the results for Test Runs 7 and 8, as well as Comparative Runs 1 and 3 which were conducted at the same temperatures.

TABLE 8

|  | Base Sorbent Only: | | Sorbent + 10 wt % Hi Activity Catalyst: | |
|---|---|---|---|---|
| Run # | 1 | 3 | 7 | 8 |
| Temp (F.) | 775 | 825 | 775 | 825 |
| Prod Sulfur (ppmw) | 35.80 | 63.10 | 40.00 | 65.50 |
| Octane Loss | 0.57 | −0.20 | −0.76 | −1.48 |
| Delta Octane (from Base) |  |  | 1.33 | 1.28 |
| Net C3 − (wt %) | 0.10 | 0.20 | 1.60 | 2.60 |
| Net C4 − (wt %) | 0.19 | 0.50 | 3.80 | 6.40 |
| H2 Consump (calc) (scf/bbl) | 56.80 | 43.90 | 71.80 | 45.90 |
| Delta RVP | −0.03 | −0.10 | 0.50 | 0.97 |
| Feed API | 52.09 | 51.74 | 52.24 | 52.22 |
| Feed RVP | 5.35 | 5.24 | 5.27 | 5.29 |
| Feed SG | 0.77 | 0.77 | 0.77 | 0.77 |
| Product API | 52.72 | 51.98 | 53.96 | 54.79 |
| Product RVP | 5.32 | 5.14 | 5.77 | 6.26 |
| Product SG | 0.77 | 0.77 | 0.76 | 0.76 |
| Vol % Loss | 0.00 | 0.36 | 2.90 | 5.09 |
| % Vol Retained | 100.00 | 99.64 | 97.10 | 94.91 |
| % Vol Retained × Delta Octane |  |  | 129.14 | 121.48 |
| % Vol Loss per Octane Gain Over Base |  |  | 2.18 | 3.98 |
| Octane Gain Per % Vol Lost |  |  | 0.46 | 0.25 |

Example 4

(15% High Activity)

In this Example, one Test Run (9) was performed with 15 weight percent of the High Activity Catalyst being added to the base sorbent system. Test Run 9 was performed at an adsorber temperature of 775° F. Table 9 shows the results for Test Run 9, as well as Comparative Run 1 which was conducted at the same temperature.

TABLE 9

|  | Base Sorbent Only: | Sorbent + 15 wt % Hi Activity Catalyst: |
|---|---|---|
| Run # | 1 | 9 |
| Temp (F.) | 775 | 775 |
| Prod Sulfur (ppmw) | 35.80 | 49.90 |
| Octane Loss | 0.57 | −1.10 |
| Delta Octane (from Base) |  | 1.67 |
| Net C3− (wt %) | 0.10 | 2.40 |
| Net C4− (wt %) | 0.19 | 5.20 |
| H2 Consump (calc) (scf/bbl) | 56.80 | 72.50 |
| Delta RVP | −0.03 | 0.73 |
| Feed API | 52.09 | 52.34 |
| Feed RVP | 5.35 | 5.31 |
| Feed SG | 0.77 | 0.77 |
| Product API | 52.72 | 54.44 |
| Product RVP | 5.32 | 6.04 |
| Product SG | 0.77 | 0.76 |
| Vol % Loss | 0.00 | 4.12 |
| % Vol Retained | 100.00 | 95.88 |
| % Vol Retained × Delta Octane |  | 160.12 |
| % Vol Loss per Octane Gain Over Base |  | 2.47 |
| Octane Gain Per % Vol Lost |  | 0.41 |

Example 5

(2.5% High Selectivity #1)

In this Example, three Test Runs (10, 11, and 12) were performed with 2.5 weight percent of the High Selectivity Catalyst #1 being added to the base sorbent system. Test Runs 10, 11, and 12 were performed at adsorber temperatures of 775° F., 800° F., and 833° F. Table 10 shows the results for Test Runs 10, 11, and 12, as well as Comparative Runs 1, 2, and 3 which were conducted at the same or similar temperatures.

TABLE 10

|  | Base Sorbent Only: | | | Sorbent + 2.5 wt % Hi Selectivity #1: | | |
|---|---|---|---|---|---|---|
| Run # | 1 | 2 | 3 | 10 | 11 | 12 |
| Temp (F.) | 775 | 800 | 825 | 775 | 800 | 833 |
| Prod Sulfur (ppmw) | 35.80 | 45.10 | 63.10 | 39.80 | 48.50 | 69.00 |
| Octane Loss | 0.57 | 0.09 | −0.20 | −0.08 | −0.54 | −0.98 |
| Delta Octane (from Base) |  |  |  | 0.65 | 0.63 | 0.78 |
| Net C3− (wt %) | 0.10 | 0.18 | 0.20 | 0.52 | 0.90 | 1.13 |
| Net C4− (wt %) | 0.19 | 0.30 | 0.50 | 1.24 | 2.10 | 2.70 |
| H2 Consump (calc) (scf/bbl) | 56.80 | 41.50 | 43.90 | 50.60 | 46.60 | 32.40 |
| Delta RVP | −0.03 | 0.03 | −0.10 | 0.13 | 0.20 | 0.48 |
| Feed API | 52.09 | 51.74 | 51.74 | 52.34 | 52.63 | 52.38 |
| Feed RVP | 5.35 | 5.24 | 5.24 | 5.29 | 5.37 | 5.31 |
| Feed SG | 0.77 | 0.77 | 0.77 | 0.77 | 0.77 | 0.77 |
| Product API | 52.72 | 52.32 | 51.98 | 53.26 | 53.53 | 54.07 |
| Product RVP | 5.32 | 5.27 | 5.14 | 5.42 | 5.57 | 5.79 |
| Product SG | 0.77 | 0.77 | 0.77 | 0.77 | 0.76 | 0.76 |
| Vol % Loss | 0.00 | 0.00 | 0.36 | 0.75 | 1.62 | 1.80 |
| % Vol Retained | 100.00 | 100.00 | 99.64 | 99.25 | 98.38 | 98.20 |
| % Vol Retained × Delta Octane |  |  |  | 64.52 | 61.98 | 76.59 |
| % Vol Loss per Octane Gain Over Base |  |  |  | 1.15 | 2.57 | 2.31 |
| Octane Gain Per % Vol Lost |  |  |  | 0.87 | 0.39 | 0.43 |

Example 6

(Various Amounts of High Selectivity #1)

In this Example, four Test Runs (12, 13, 14, and 15) were performed with various amounts of the High Selectivity Catalyst #1 being added to the base sorbent system. Test Runs 12, 13, 14, and 15 employed 2.5, 5, 7.5, and 10 weight percent of the High Selectivity Catalyst #1, respectively. Test Runs 12, 13, 14, and 15 were all performed at an adsorber temperature of 775° F. Table 11 shows the results for Test Runs 12, 13, 14, and 15, as well as Comparative Run 1 which was conducted at the same temperature.

TABLE 11

|  | Base Sorbent Only: | Base Sorbent + | | | |
|---|---|---|---|---|---|
|  |  | 2.5% HS #1 | 5% HS #1 | 7.5% HS #1 | 10% HS #1 |
| Run # | 1 | 12 | 13 | 14 | 15 |
| Temp (F.) | 775 | 775 | 775 | 775 | 775 |
| Prod Sulfur (ppmw) | 35.80 | 39.80 | 45.50 | 42.90 | 44.90 |
| Octane Loss | 0.57 | −0.08 | −0.35 | −0.54 | −0.71 |
| Delta Octane (from Base) |  | 0.65 | 0.92 | 1.11 | 1.28 |
| Net C3− (wt %) | 0.10 | 0.52 | 0.68 | 0.88 | 0.85 |
| Net C4− (wt %) | 0.19 | 1.24 | 1.67 | 2.28 | 2.38 |
| H2 Consump (calc) (scf/bbl) | 56.80 | 50.60 | 51.10 | 51.10 | 49.10 |
| Delta RVP | −0.03 | 0.13 | 0.16 | 0.35 | 0.34 |
| Feed API | 52.09 | 52.34 | 52.77 | 52.77 | 52.29 |
| Feed RVP | 5.35 | 5.29 | 5.39 | 5.39 | 5.29 |
| Feed SG | 0.77 | 0.77 | 0.77 | 0.77 | 0.77 |
| Product API | 52.72 | 53.26 | 53.54 | 54.14 | 53.66 |
| Product RVP | 5.32 | 5.42 | 5.55 | 5.74 | 5.63 |
| Product SG | 0.77 | 0.77 | 0.76 | 0.76 | 0.76 |
| Vol % Loss | 0.00 | 0.75 | 1.26 | 1.55 | 1.65 |
| % Vol Retained | 100.00 | 99.25 | 98.74 | 98.45 | 98.35 |
| % Vol Retained × Delta Octane |  | 64.52 | 90.84 | 109.28 | 125.89 |
| % Vol Loss per Octane Gain Over Base |  | 1.15 | 1.37 | 1.40 | 1.29 |
| Octane Gain Per % Vol Lost |  | 0.87 | 0.73 | 0.72 | 0.78 |

Example 7

(Various Amounts of High Selectivity #2)

In this Example, three Test Runs (16, 17, and 18) were performed with various amounts of the High Selectivity Catalyst #2 being added to the base sorbent system. Test Runs 16 and 17 employed 5 weight percent of the High Selectivity Catalyst #2, while Test Run 18 employed 10 weight percent of the High Selectivity Catalyst #2. Test Runs 16, 17, and 18 were all performed at an adsorber temperature of 775° F. Table 12 shows the results for Test Runs 16, 17, and 18, as well as Comparative Run 1 which was conducted at the same temperature.

TABLE 12

|  | Base Sorbent Only: | Base Sorbent + | | |
|---|---|---|---|---|
|  |  | 5% HS #2 | 5% HS #2 | 10% HS #2 |
| Run # | 1 | 16 | 17 | 18 |
| Temp (F.) | 775 | 775 | 775 | 775 |
| Prod Sulfur (ppmw) | 35.80 | 43.60 | 43.90 | 49.80 |
| Octane Loss | 0.57 | −0.42 | −0.32 | −0.68 |
| Delta Octane (from Base) |  | 0.99 | 0.89 | 1.25 |
| Net C3 − (wt %) | 0.10 | 0.84 | 0.78 | 1.30 |
| Net C4 − (wt %) | 0.19 | 2.07 | 1.94 | 3.10 |
| H2 Consump (calc) (scf/bbl) | 56.80 | 63.80 | 59.40 | 55.60 |
| Delta RVP | −0.03 | 0.16 | 0.22 | 0.48 |
| Feed API | 52.09 | 52.50 | 52.25 | 52.23 |
| Feed RVP | 5.35 | 5.37 | 5.29 | 5.25 |
| Feed SG | 0.77 | 0.77 | 0.77 | 0.77 |
| Product API | 52.72 | 53.40 | 53.33 | 53.85 |
| Product RVP | 5.32 | 5.53 | 5.51 | 5.73 |
| Product SG | 0.77 | 0.77 | 0.77 | 0.76 |
| Vol % Loss | 0.00 | 1.59 | 1.37 | 2.24 |
| % Vol Retained | 100.00 | 98.41 | 98.63 | 97.76 |
| % Vol Retained × Delta Octane |  | 97.42 | 87.78 | 122.19 |
| % Vol Loss per Octane Gain Over Base |  | 1.61 | 1.54 | 1.80 |
| Octane Gain Per % Vol Lost |  | 0.62 | 0.65 | 0.56 |

Figure 3:
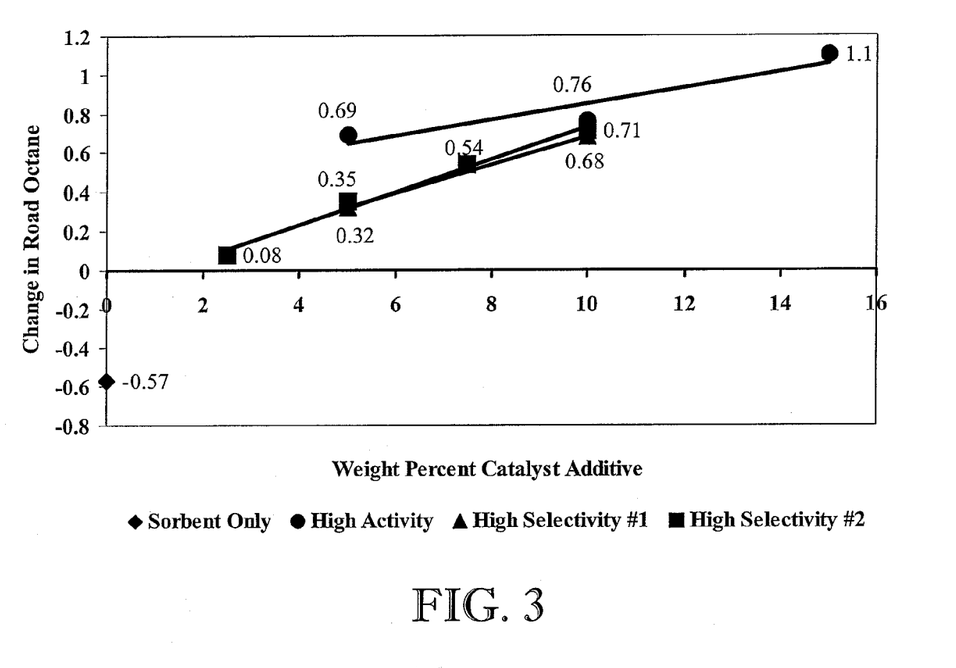
FIG. 3 is a graph plotting change in road octane versus weight percent of catalyst additive for desulfurization tests summarized in the EXAMPLES section.
Figure 4:
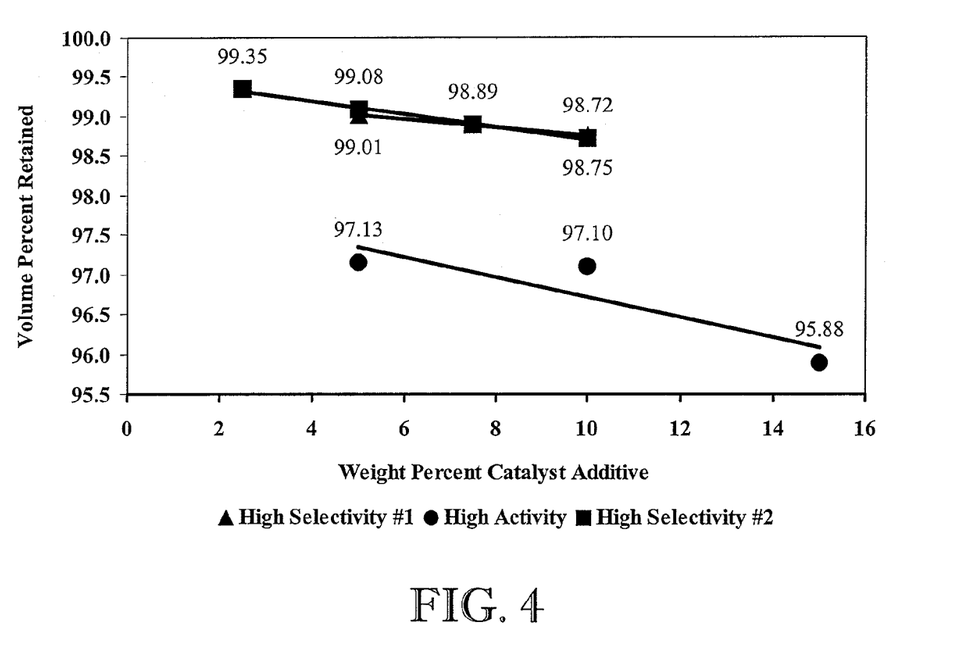
FIG. 4 is a graph plotting volume percent retained versus weight percent of catalyst additive for desulfurization tests summarized in the EXAMPLES section.

Examples 1-7 demonstrate that adding a H-ZSM-5 containing catalyst to the base sorbent can enhance the octane number of the resulting desulfurized product. FIG. 3 plots the change in road octane of the desulfurized naphtha product versus the weight percent of the catalyst added to the base sorbent for the base sorbent system (i.e., sorbent only), the sorbent/High Activity Catalyst system, the sorbent/High Selectivity Catalyst #1 system, and the sorbent/High Selectivity Catalyst #2 system. It can be seen from FIG. 3 that in all cases the addition of a H-ZSM-5 containing catalyst to the base sorbent improves octane versus the base case (i.e., sorbent only). Further, it appears that the High Activity Catalyst provides the most octane enhancement, with the High Selectivity Catalysts providing slightly less octane enhancement. FIG. 3 also illustrates that the octane enhancement tends to improve as the weight percent of the cracking catalyst in the sorbent/catalyst system increases. However, FIG. 4 shows that in all cases as the weight percent of the cracking catalyst in the sorbent/catalyst system increases the volume percent of naphtha retained gradually decreases. FIG. 4 also illustrates that the High Activity Catalyst provides the lowest percent volume retained, while the two High Selectivity Catalysts provides a higher volume percent retained. Thus, the inventive sorbent/catalyst particulate system should contain an optimum type and amount of catalyst additive so that octane is significantly enhanced without a significant negative impact on other properties of the desulfurized product.

Reasonable variations, modifications, and adaptations may be made within the scope of this disclosure and the appended claims without departing from the scope of this invention.

That which is claimed is:

1. A solid particulate system comprising an unbound mixture of discrete sorbent particles and discrete catalyst particles, wherein said sorbent particles comprise zinc oxide and a promoter metal component, wherein said catalyst particles comprise a zeolite having a largest ring with at least 10 T-atoms, wherein the weight ratio of said sorbent particles to said catalyst particles is in the range of from about 100:1 to about 4:1, wherein the mean particle sizes of said sorbent particles and said catalyst particles are both in the range of from about 20 to about 200 microns.

2. The solid particulate system of claim 1, wherein said solid particulate system consists essentially of said sorbent particles and said catalyst particles.

3. The solid particulate system of claim 1, wherein said catalyst particles have an average particle density that is within 50 percent of the average particle density of the sorbent particles.

4. The solid particulate system of claim 1, wherein said sorbent particles and catalyst particles both have a Group A Geldart characterization.

5. The solid particulate system of claim 1, wherein said sorbent particles and catalyst particles both have a Jet Cup Attrition Index value of less than about 20.

6. The solid particulate system of claim 1, wherein the weight ratio of said sorbent particles to said catalyst particles is in the range of from about 40:1 to about 5:1.

7. The solid particulate system of claim 1, wherein the weight ratio of said sorbent particles to said catalyst particles is in the range of from about 20:1 to about 10:1.

8. The solid particulate system of claim 1, wherein said zeolite has a framework type code selected from the group consisting of AFS, AFY, BEA, BEC, BHP, CGS, CLO, CON, DFO, EMT, FAU, GME, ISV, MEI, MEL, MFI, SAO, SBS, SBT, and WEN.

9. The solid particulate system of claim 8, wherein said zeolite has a silica-alumina ratio in the range of from about 20 to about 1000.

10. The solid particulate system of claim 1, wherein said zeolite has a MFI framework type code.

11. The solid particulate system of claim 1, wherein said promoter metal component comprises a promoter metal selected from the group consisting of nickel, cobalt, iron, manganese, tungsten, silver, gold, copper, platinum, zinc, ruthenium, molybdenum, antimony, vanadium, iridium, chromium, and palladium.

12. The solid particulate system of claim 11, wherein said promoter metal component is a substitutional solid metal solution characterized by the formula $M_AZn_B$, wherein M is said promoter metal and A and B are numerical values in the range of from 0.01 to 0.99.

13. The solid particulate system of claim 12, wherein A is in the range of from 0.1 to 0.97 and B is in the range of from 0.03 to 0.3.

14. The solid particulate system of claim 13, wherein said promoter metal is nickel, A is in the range of from 0.85 to 0.95, and B is in the range of from 0.5 to 0.15.

15. The solid particulate system of claim 1, wherein said sorbent particles comprise zinc oxide in an amount in the range of from about 20 to about 60 weight percent and said promoter metal component in an amount in the range of from about 20 to about 60 weight percent.

16. The solid particulate system of claim 1, wherein said catalyst particles comprise said zeolite in an amount in the range of from about 5 to about 50 weight percent.

17. The solid particulate system of claim 1, wherein said catalyst particles consist essentially of zeolite and a binder component.

18. The solid particulate system of claim 17, wherein said promoter metal component comprises nickel.

19. A solid particulate system comprising an unbound mixture of discrete sorbent particles and discrete catalyst particles, wherein said sorbent particles comprise zinc oxide and a promoter metal component, wherein said catalyst particles comprise a zeolite having a largest ring with at least 10 T-atoms, wherein the weight ratio of said sorbent particles to said catalyst particles is in the range of from about 100:1 to about 4:1, wherein the mean particle sizes of said sorbent particles and said catalyst particles are both in the range of from about 20 to about 200 microns, wherein said promoter metal component comprises nickel, wherein said catalyst particles consist essentially of zeolite and a binder component.

* * * * *